Figure 1:
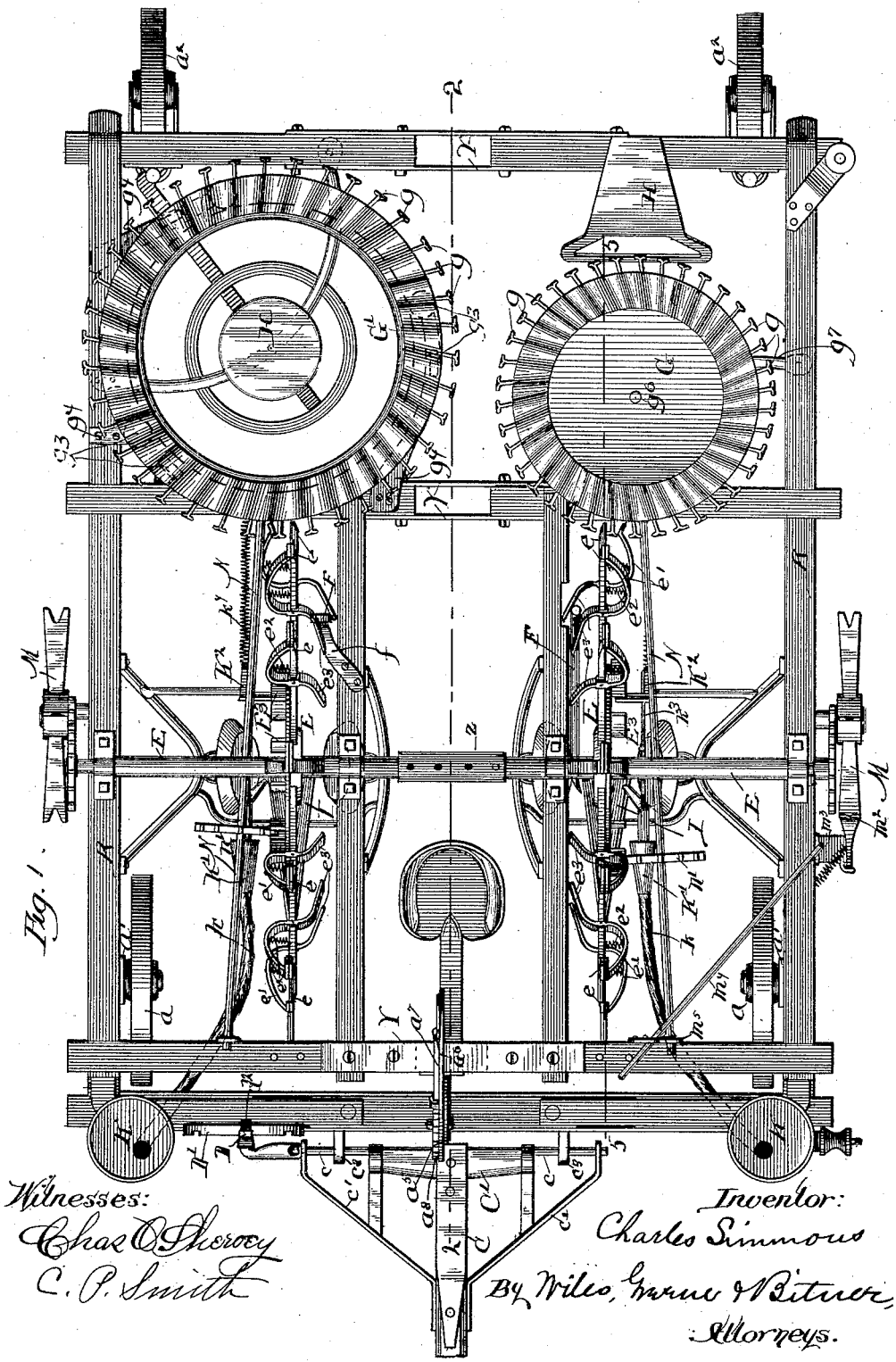

(No Model.) 3 Sheets—Sheet 1.

C. SIMMONS.
TOBACCO TRANSPLANTER.

No. 469,506. Patented Feb. 23, 1892.

Witnesses:
Chas O. Shorey
C. P. Smith

Inventor:
Charles Simmons
By Wiles, Brune & Bitner,
Attorneys.

THE NORRIS PETERS CO., PHOTO-LITHO., WASHINGTON, D. C.

(No Model.) 3 Sheets—Sheet 2.
C. SIMMONS.
TOBACCO TRANSPLANTER.
No. 469,506. Patented Feb. 23, 1892.
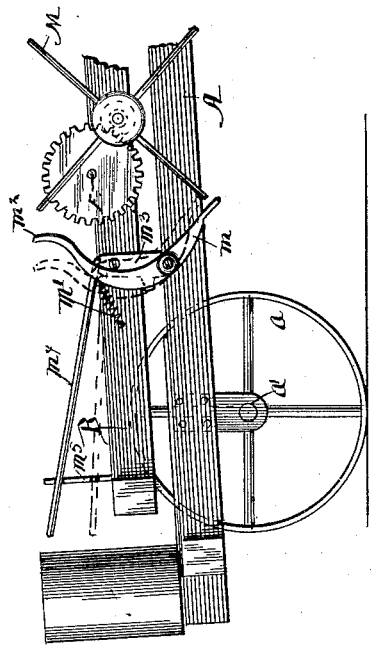
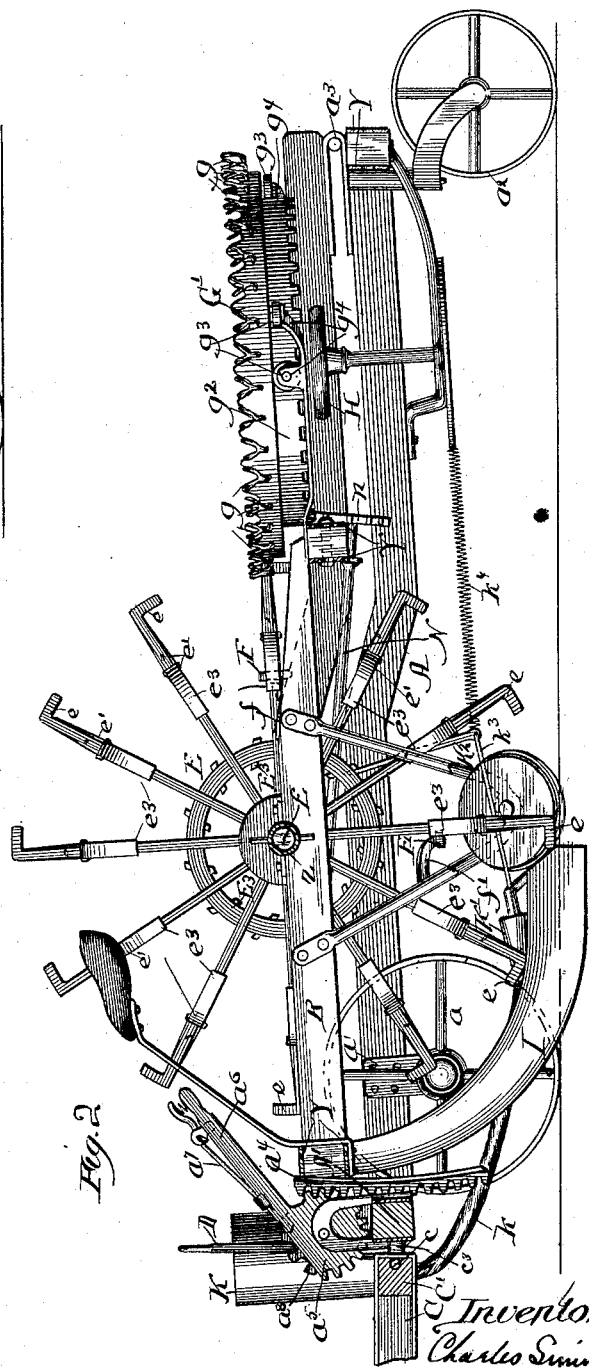
Witnesses:
Chas O. Shewey.
C. P. Smith.
Inventor:
Charles Simmons
By Wiles, Greene & Bittner
Attorneys.

(No Model.) 3 Sheets—Sheet 3.

C. SIMMONS.
TOBACCO TRANSPLANTER.

No. 469,506. Patented Feb. 23, 1892.

Witnesses:
Chas O. Shorey.
C. P. Smith.

Inventor:
Charles Simmons
By Wiles, Morris & Bitner
Attorneys.

UNITED STATES PATENT OFFICE.

CHARLES SIMMONS, OF STOCKTON, ILLINOIS.

TOBACCO-TRANSPLANTER.

SPECIFICATION forming part of Letters Patent No. 469,506, dated February 23, 1892.

Application filed May 4, 1891. Serial No. 391,505. (No model.)

*To all whom it may concern:*

Be it known that I, CHARLES SIMMONS, a citizen of the United States of America, residing at Stockton, in the county of Jo Daviess and State of Illinois, have invented certain new and useful Improvements in Tobacco-Transplanters, of which the following is a specification.

My invention relates to a device for planting tobacco-plants in equidistant rows and at regular intervals, its object being to perform automatically the work of placing the plants in the ground and packing the dirt around the roots of the same.

I have chosen as a means of operating my machine an ordinary check-row cord, passing over a check-row wheel mounted upon a driving-shaft, which operates the planting mechanism of the machine. It is obvious, of course, that any other means of driving the machinery could be employed, and that the check-row cord is essential to only such portions of the device as are necessarily associated therewith.

The general plan of my machine is to provide a table, preferably movable, along which the plants may be laid by hand and which as it moves may carry them within reach of gripping devices adapted to seize them one at a time and place them in a depression formed in the ground by the machine, preferably also moistened, and then to provide means for packing the earth about the roots just before the plant is released.

A great variety of constructions might be devised in which certain of the preferred forms of my machine might be either greatly changed or omitted. Hence I do not limit myself to the specific devices shown or to any combinations thereof, except as definitely pointed out in the claims appended hereto. My preferred construction is fully illustrated in the drawings presented herewith, in which—

Figure 4:
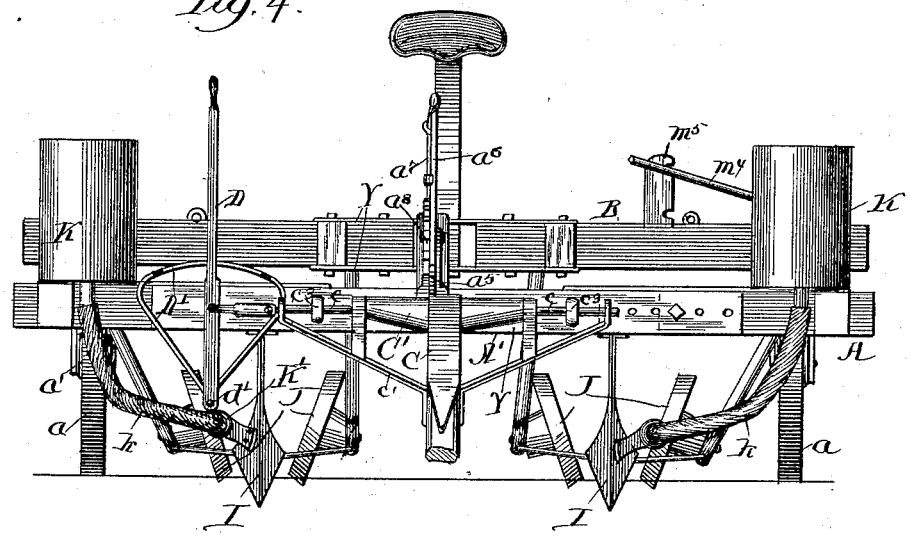
Figure 5:
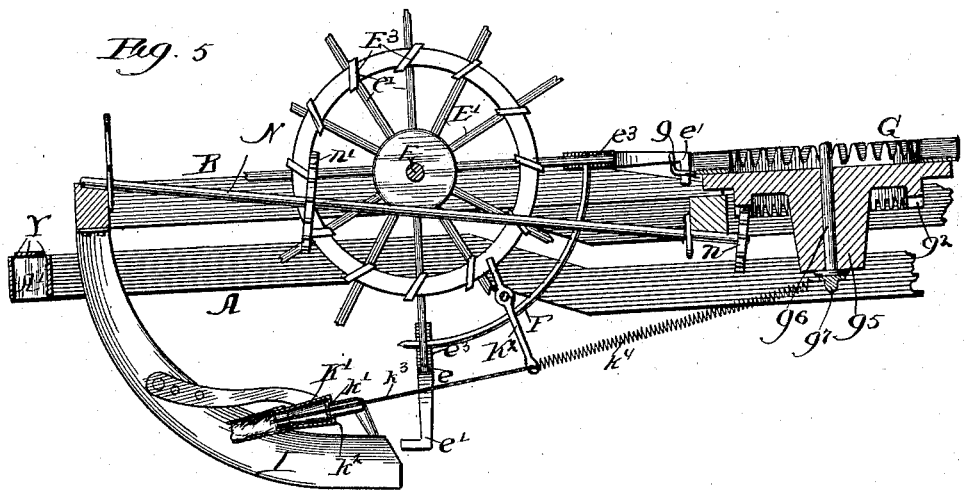

Figure 1 is a plan view of my entire device; Fig. 2, a vertical section taken in line 2 2 of Fig. 1; Fig. 3, a partial side view; Fig. 4, a front view, and Fig. 5 a section taken in line 5 5 of Fig. 1.

Said construction consists of a suitable frame A, mounted upon wheels $a$, journaled upon standards $a'$, secured to the frame, and upon caster-wheels $a^2$ at the rear of the machine. Another frame B, of similar shape to the frame A, is placed immediately above the latter, and the two are united at one end by means of hinges $a^3$. At the other end a rack or segment $a^4$ is rigidly secured to the forward cross-piece of the frame B, and a pinion $a^5$, pivotally secured to a V-shaped standard bolted to the forward cross-piece A' of the frame A, meshes with it. The pinion is provided with a hand-lever $a^6$, bearing a spring-catch $a^7$, adapted to engage with a segment $a^8$ rigidly secured to the cross-piece A' of the frame A. This furnishes means of raising or lowering the upper of the two frames—that is, the frame B—and as the planting devices are placed upon this frame it enables them to be raised and lowered for the purpose of planting either shallower or more deeply, and also for the purpose of removing them entirely from the ground in transporting the machine from place to place.

As the machine is provided with a check-row wheel at each side in order that it may be operated on either side of the check-row cord, the tongue cannot be permanently secured to the frame in a single position without causing an unequal draft when traveling upon one side of the cord or the other. To overcome this difficulty I have made the tongue laterally adjustable. To do this a rod $c$ is securely fastened to the cross-piece C' of the tongue C, and suitably braced by braces $c'$, bolted to the tongue and to the respective ends of the rod $c$. This rod is pivotally secured to the frame by means of ears $c^3$, fastened thereto in any suitable manner, and so located that the rod $c$ may slide laterally therein. This rod also extends beyond one of the braces $c'$ at one side, and is there connected with a hand-lever D, pivoted at $d'$ to the frame A and engaging with a notched segment D', by means of which it may be held in any desired number of positions, determined by the location of the notches in the segment. The lever is held in the notches by means of a spring $d^2$. This furnishes a ready and convenient method of equalizing the draft and adjusting the tongue to all possible conditions with perfect ease.

A shaft E is journaled upon the upper frame B by means of suitable boxes and bears at its respective ends the check-row wheels M, by means of which it is operated. As the cord rests its weight upon one of the check-row wheels, it is sometimes liable to move the same when none of the buttons or knots are passing over the wheel. To prevent this a stop $m$ is pivoted adjacent to each of the wheels and provided with a spring $m'$, tending to throw the stop in front of the arms of the check-row wheel. An upwardly-extending arm $m^2$ of the pivoted stop is forked, as seen in Fig. 1, so that the check-row cord may slide over it. As each button on the cord reaches this arm it forces it along, overcoming the force of the spring $m'$ and removing the opposite end of the stop out of the way of the check-row wheel, allowing the latter to be rotated by the button as it passes on. To enable the stop to be thrown entirely out of action when it is desired, it is pivoted upon a plate $m^3$, itself pivoted to the frame and provided with a lever $m^4$, by means of which it may be oscillated on its pivot. This lever engages by its own spring with a notched standard $m^5$.

The devices for seizing the plants and placing them in the earth consist of star-shaped wheels E', having nippers upon their radial arms composed of the ends $e$ of the arms themselves, and S-shaped fingers $e'$, pivoted thereto. Both the arms $e$ and the fingers $e'$ are bent at right angles, but in the same plane as the wheels, for the purpose of seizing and holding the plants more easily and securely. This is best seen in Fig. 2. A light tension-spring $e^2$ keeps them closed, and they are provided with tails $e^3$, adapted to engage with rollers F F', supported by brackets $f f'$, so that when they strike the roller F they are opened just in time to seize a plant, and then when they strike the roller F' they are opened to release it in the furrow made by the other portions of the machine. A modification of the rollers F F' is shown in connection with the right-hand wheel of Fig. 1. This consists of a cam-rod, which opens the nippers to drop the plant and keeps them open until they are in position to grasp a new plant.

Directly behind the wheels E carrying-tables G G' are placed. The upper surfaces of these tables are corrugated or grooved, and projecting outward from each groove is a finger $g$, bent upward and split to form a V-shaped support. The roots of the plants lie in the grooves and the leaves rest in the fingers, so that the grippers can seize them about in the middle. The table G' is annular in shape, and has a circular flange $g^2$, projecting downward from its lower surface and cut to form a crown gear-wheel. This table is supported upon guides or rollers $g^3$, journaled upon brackets $g^4$, three of which press against the flange $g^2$ and three against the bottom of the table. This makes a very substantial support for it, inasmuch as there is little friction and the rollers hold it securely in place. The table G, which is regarded as an equivalent form, is solid and has a sleeve $g^5$, projecting downward around a stem $g^6$, supported upon braces $g^7$, bolted to the frame A. This table has, also, a downwardly-projecting flange $g^2$, corresponding to that upon the table G'.

A planter's seat H is placed in the center of the table G' and suitably supported from the frame of the machine. In the case of the table G the seat is placed behind and supported in the same manner. The carrying-tables are rotated by means of shafts N, journaled in suitable brackets in the frame B, and carrying at the proper places pinions $n$ $n'$, engaging, respectively, with the crown-wheel beneath one of the tables, and a side gear $E^3$ upon one of the wheels E. The grooves in the rotating tables G G' are preferably radial, or nearly so, as shown, so that the plants when laid in the grooves and in the fingers $g$ project from the tables in approximately radial lines and are in the best possible position to be readily seized by the nippers upon the planting-wheels.

Directly in front of each of the planting-wheels is a furrow-opener I, bolted securely at its upper end to the frame of the machine. These furrow-openers are sharp in front, so as to cut into the soil, and spread apart as they extend backward. At the rear portion they flare upward so as to prevent any dirt from falling into the furrow until the plant is released by the grippers. Beveled covering-wheels J are journaled on each side of the planting-wheels in position to press the soil around the roots of the plant just before it is released. Tanks K, supported upon the frame B, carry a supply of water, and are each provided with a hose $k$, leading to the points where the plants are placed in the ground. It here terminates in an automatic faucet K', normally closed by a valve $k'$, held against a seat $k^2$ by means of a rod $k^3$ and spring $k^4$. A pivoted lever $K^2$ is supported upon the frame, engaging at one end with the rod $k^3$, and having at the other end a finger adapted to engage with projections corresponding to the arms of one of the wheels E. As said wheels are advanced one of these projections operates the lever, opens the valve, and discharges a quantity of water in the furrow just as one of the plants is carried into position by the planting-wheel, and immediately before the earth is pressed about its roots, so that the latter are thoroughly watered at the moment they are planted. The upper frame, or the one carrying the planting mechanism, is laterally adjustable by means of plates Y uniting two separate portions thereof and secured to the frame by means of bolts fitted to a series of holes, so that the entire frame may be either widened or narrowed, varying the distance between the planting-wheels to any width of row that may be desired.

The central shaft E is also divided into two portions and connected by a sleeve or collar $z$, secured to the two portions of the shaft by means of pins, also fitted to a series of holes, so that the shaft may be lengthened or shortened to correspond with the varying widths of the machine. This renders the device easily adjustable, so that the plants may be placed in rows at any distance apart that may be preferred. They may also be spaced in their respective rows, as is thought best, by means of check-row cords bearing knots or buttons at intervals regulated by the desired distance between the plants. This is, of course, a common use of a check-row cord, and is only mentioned to show that the device herein described is adjustable to all the requirements that are likely to be met.

I claim as new and desire to secure by Letters Patent—

1. In a machine of the class described, the combination, with a suitable frame, of a rotating circular table for receiving and carrying plants, a vertical planting-wheel having its margin in close proximity to the margin of the rotating table, and gripping devices mounted at suitable intervals upon the margin of the planting-wheel and adapted to take the plants from the margin of the table and insert them in the ground at suitable intervals, substantially as shown and described.

2. In a machine of the class described, the combination, with a suitable frame, of a rotating circular table formed with approximately radial grooves extending to its margin and adapted to receive a series of plants, a vertical planting-wheel having its margin within working distance of the margin of the table, and gripping devices attached to the edge of the planting-wheel and adapted to take the plants successively from the rotating table and insert them in the ground, substantially as shown and described.

3. In a machine of the class described, the combination, with a suitable frame, of a rotating circular table having an opening at its center for an operator's seat, means, substantially as shown and described, adapting the table to receive and carry a series of plants projecting beyond its margin at regular intervals, a vertical planting-wheel in working relation to the table, and a series of gripping devices attached to the margin of the planting-wheel and adapted to seize the plants in succession and convey them to the ground, substantially as shown and described.

4. In a machine of the class described, a frame made up of two parts laterally adjustable upon each other, rotating horizontal tables supported by the two parts of the frame, respectively, vertical planting-wheels supported by the two parts of the frame, respectively, in working relation to said rotating tables, and gripping devices mounted on the margins of said planting-wheels and adapted to take the plants from said tables and place them in the ground, substantially as shown and described.

5. The combination, with the frame A, of the ears $c^3$, attached to the front end of the frame, the tongue C, the transverse rod $c$, fastened to the tongue and sliding in openings in the ears $c^3$, the lever D, pivoted to the frame and to the rod $c$, and the segment D', fastened to the frame and provided with notches adapted to receive the lever and retain it in any desired position, whereby the tongue may be laterally adjusted and secured, substantially as shown and described.

6. The combination, with a check-row wheel M, of a stop $m$, provided with a fork $m^2$, said stop being mounted upon an adjustable pivot and provided with a spring adapted to throw it into engagement with the check-row wheel, substantially as described.

7. The combination of a check-row wheel M, a stop $m$, having a forked arm $m^2$, an oscillating plate $m^3$, pivoted to the stop and provided with an arm $m^4$, having means for adjustably securing it in different positions, and a spring $m'$, adapted to throw the stop into engagement with the check-row wheel, substantially as described.

CHARLES SIMMONS.

Witnesses:
 EMMA HOPKINS,
 B. F. SIMMONS.